United States Patent [19]
Chapman et al.

[11] 3,927,982
[45] Dec. 23, 1975

[54] RECIRCULATING APPARATUS FOR CONTINUOUS ESTERIFICATION REACTIONS

[75] Inventors: Rodney M. Chapman, Kinston, N.C.; Kenneth A. Temple, Richmond, Va.

[73] Assignee: E. I. Du Pont de Nemours & Company, Wilmington, Del.

[22] Filed: June 19, 1973

[21] Appl. No.: 371,502

Related U.S. Application Data

[62] Division of Ser. No. 20,704, March 18, 1970, abandoned.

[52] U.S. Cl. ............... 23/260; 23/285; 260/475 P
[51] Int. Cl.² .... C07C 69/76; B01J 8/12; B01J 8/00
[58] Field of Search ............ 260/475 P; 23/260, 285

[56] References Cited
UNITED STATES PATENTS

| | | | |
|---|---|---|---|
| 2,820,815 | 1/1958 | Matuszak et al. | 23/260 X |
| 2,925,450 | 2/1960 | Schmalenbach et al. | 23/285 X |
| 3,227,743 | 1/1966 | Shaw et al. | 260/475 R |
| 3,458,467 | 7/1969 | Herrle et al. | 23/285 X |
| 3,497,473 | 2/1970 | Kemkes | 260/475 P UX |
| 3,527,820 | 9/1970 | Mercier | 23/260 X |
| 3,544,269 | 12/1970 | Rushton | 23/285 X |
| 3,600,137 | 8/1971 | Girantet et al. | 260/475 P X |
| 3,644,096 | 2/1972 | Lewis et al. | 260/475 P X |
| 3,676,485 | 7/1972 | Lewis et al. | 260/475 P |
| 3,697,579 | 10/1972 | Balent et al. | 260/475 P X |

FOREIGN PATENTS OR APPLICATIONS

1,114,476   5/1968   United Kingdom

*Primary Examiner*—Barry S. Richman

[57] ABSTRACT

Apparatus for continuous esterification in the presence of hot liquid esterification product which is circulated downward from the bottom of an esterification vessel, upward through an external heat exchanger and back to the vessel without mechanical pumping; including means for introducing reactant feed mixture directly into the lower fluid inlet of the heat exchanger and means for withdrawing esterification product directly from the vessel at a rate which maintains a constant liquid level. Esterification of terephthalic acid with ethylene glycol at 315°C. to form low molecular weight polyester product is illustrated.

1 Claim, 1 Drawing Figure

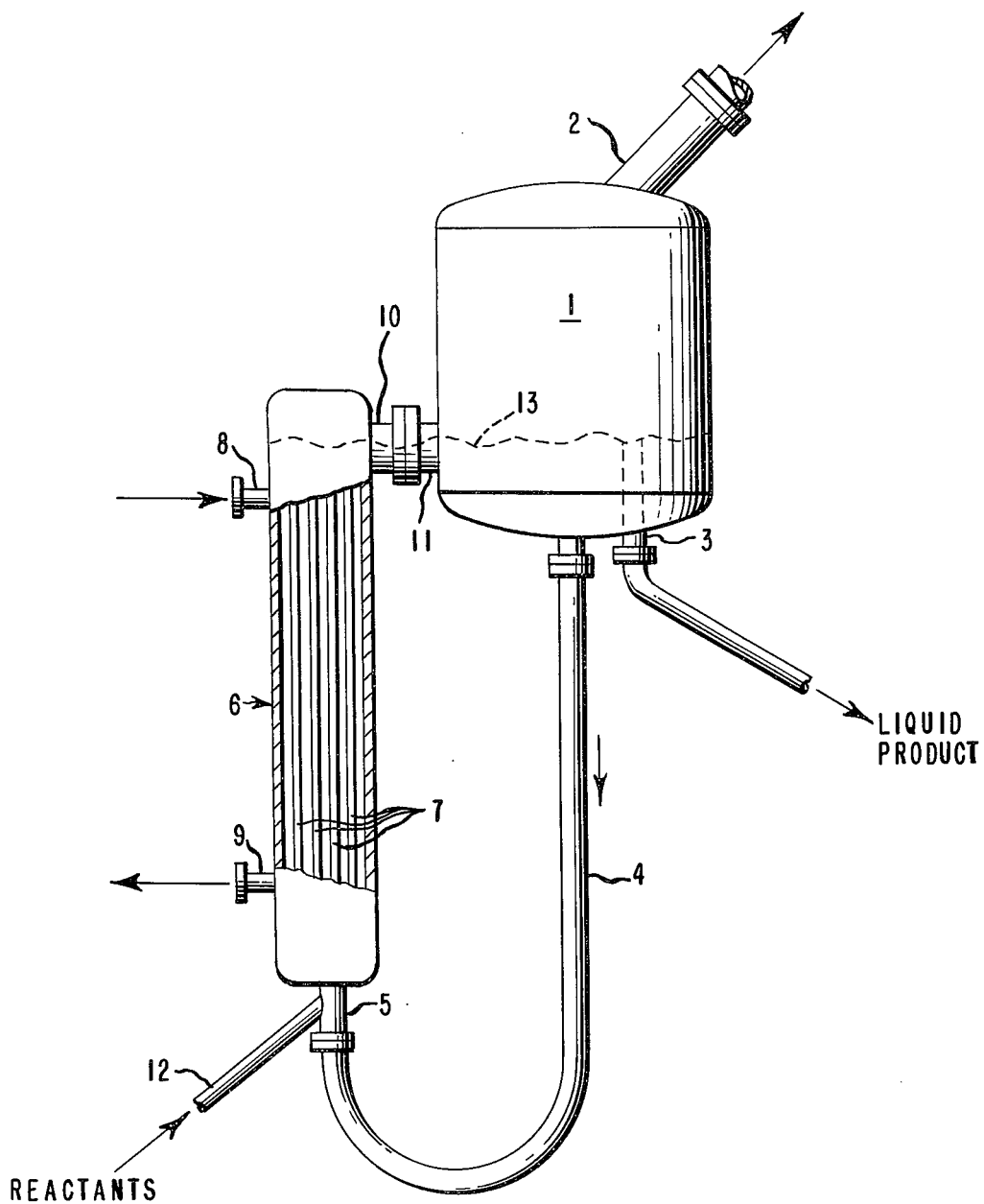

RECIRCULATING APPARATUS FOR CONTINUOUS ESTERIFICATION REACTIONS

REFERENCE TO RELATED APPLICATION

This is a division of copending application Ser. No. 20,704, filed Mar. 18, 1970, and now abandoned.

FIELD OF THE INVENTION

This invention relates to a process and apparatus for continuous reactions in the presence of hot reaction product. More particularly, it is concerned with an improved process and apparatus for carrying out continuous esterification reactions.

Continuous reactions which involve introducing reactants into a reactor containing reaction product maintained at a high temperature frequently require introduction of cold reactants at a uniform rate while providing effective mixing and heating to maintain a high reaction rate. This is particularly important in esterification reactions, as in the formation of esters for use in production of polyester fibers, when a rapid reaction rate without overheating of reactants is desired to avoid discoloration. An illustration is the direct esterification of terephthalic acid with ethylene glycol in accordance with Mellichamp U.S. Pat. No. 3,496,146, dated Feb. 17, 1970.

Since terephthalic acid is a solid at room temperature, it is introduced into a reactor as a slurry in ethylene glycol. Although a simple type of stirred and heated vessel can be used for the reaction, it has been found that important improvements result from providing more efficient mixing, a high rate of heat transfer at relatively high temperatures, and close control of temperature limits.

SUMMARY OF THE INVENTION

The present invention provides a chemical process apparatus which is self-stirring and provides vigorous agitation of reacting materials without the use of mechanical stirring or pumping. The invention also provides for a system capable of transferring heat to reactants at a high rate. The invention also provides process improvements suitable for commercial esterification reactions, particularly the first stage of a polyesterification process.

According to the invention there is provided an apparatus suitable for esterification reactions without mechanical stirring or pumping which comprises an esterification vessel in combination with a heat exchanger having vertically extending passages for fluid and having an upper fluid outlet and a lower fluid inlet, the upper outlet communicating with the side of the reaction vessel and the lower inlet being connected with the bottom of the reaction vessel by a conduit loop, overflow means in the vessel for continuous withdrawal of esterification product at a rate which maintains a constant liquid level, means in the upper part of the vessel for withdrawing vapors and means for injecting cold reactant feed mixture into the lower fluid inlet of the heat exchanger.

In using this apparatus as an esterification reactor, the reactor is first prefilled with reaction product, heated to reaction temperature, e.g., 250° to 400°C., and then a cold feed mixture of organic acid reactant and organic hydroxy reactant is continuously pumped into the lower fluid inlet of the heat exchanger. In the inlet end of the heat exchanger, the cold reactant feed is quickly mixed with the hot reaction product recycling between the reaction vessel and the heat exchanger, and thereby quickly brought to reaction temperature. Because of the rapid transfer of heat to the reactor contents in the heat exchanger, cooling effects of the cold feed mixture are minimized in the mixing zone. Water or other volatile by-product of the esterification reaction evolved in the heat exchanger provides a vapor-lift effect sufficient to cause a rapid recirculation of the reactor contents. By-product vapor and excess organic hydroxy reactant vapor are removed from the reaction vessel, to maintain a constant pressure, through the means for withdrawing gaseous products, and liquid reaction product is continuously drawn off from the reaction vessel through the overflow means provided to maintain a constant liquid level.

Where the organic acid reactant is a dicarboxylic acid, or dicarboxylic acid esterified with a low molecular weight alcohol, and the organic hydroxy reactant is a glycol, the reaction product withdrawn from the apparatus of the invention may be continuously fed to one or more additional reaction vessels where polycondensation conditions of low pressure and elevated temperature produce a high polymer suitable for extrusion as film or melt spinning into textile fibers.

BRIEF DESCRIPTION OF THE DRAWING AND PREFERRED PROCESS EMBODIMENT

The invention will be more fully understood by reference to the accompanying drawing in which:

FIG. 1 is a side view, partly in section, of one embodiment of the invention.

Referring now to the drawing, the reaction vessel shown generally at 1, which serves as a shallow vapor disengaging pot, is of cylindrical construction, is vertically oriented and is usually insulated to prevent unnecessary heat loss when operating at elevated temperatures. On the upper part of vessel 1 there is provided an outlet line 2 which may be connected to a condensor to recover liquifiable vapors removed from vessel 1. The lower part of vessel 1 is provided with standpipe 3, through which liquid products are removed for further processing.

The bottom of reaction vessel 1 is in communication with recirculation conduit 4 which is connected at its other end with the lower fluid inlet 5 of heat exchanger 6. Heat exchanger 6 comprises a plurality of vertically oriented tubes 7 which may be constructed of any conventional corrosion-resistant material having good heat transfer properties. The tubes are surrounded by heat exchange fluid which is supplied to and withdrawn from the heat exchanger through connections 8 and 9. Communication between the upper fluid outlet 10 of the heat exchanger and the interior of reaction vessel 1 is effected by conduit 11. The lower fluid inlet of the heat exchanger is provided with injection conduit 12, through which the reactant feed mixture is supplied to the apparatus.

The heat exchanger and connecting conduits are supplied with insulation to prevent undue heat loss when operating at high temperatures.

In operation, the reactor and heat exchanger are prefilled to the desired operating level 13 with reaction product, e.g., low-molecular-weight polyester, and heated to operating temperature by supplying a heating fluid, e.g., a mixture of diphenyl and diphenyl oxide, to the heat exchanger. The difference in density between the hotter liquid in heat exchanger 6 and the cooler liquid in reactor 1 and recirculation line 4 sets up a slow recirculation of material between heat exchanger and reactor. Once operating temperature is established, a mixture of reactants, e.g., a thick slurry of terephthalic acid in ethylene glycol is continuously pumped through injection conduit 12 into the lower fluid inlet of the heat exchanger. As the feed reactants are mixed with the hot reaction product and passed up through the heat exchanger, reaction takes place and vaporous products are produced. Bubbles produced by the vaporous products markedly reduce the effective density of the liquid in the heat exchanger below that of the liquid column in the right-hand side of recirculation line 4 and in vessel 1 and sufficient density difference is readily provided by heating in the heat exchanger to cause a very rapid recirculation of the fluid material to the reactor. Vaporous products are removed continuously through vapor outlet line 2 to maintain a constant pressure, and reaction product is removed continuously through standpipe 3 in an amount equivalent to the reactants supplied through injection conduit 12.

Placement of injection conduit 12 at the lower end of the heat exchanger is vitally important. With this arrangement, the initial mixing of cold reactant material with hot reaction product occurs primarily within the heat exchange tubes where maximum rate of heat input is available to effectively prevent deposition of solid or viscous material. The apparatus arrangement provides almost instantaneous heating of the cold feed mixture to full reaction temperature. It will be apparent that the reactor of this invention is particularly valuable for use in those situations where it is desired to maintain the reaction mixture at room temperature or below until the very moment of injection into the system. Such a situation exists when the feed mixture is a slurry of finely divided terephthalic acid in ethylene glycol at a low ratio of glycol-to-acid. The cold mixture forms a stable paste, but premature warming changes the viscosity of the mixture so that the terephthalic acid may settle out and cause plugging of transfer lines, or at least result in a non-uniform supply of reactants to the system.

Preferably the apparatus of the invention is constructed of a good grade of stainless steel. For any specific use, it will be appreciated that the size of the apparatus should be related to the amount of through-put and residence time desired. The best results are obtained when the amount of heat-transfer surface in the heat exchanger falls within the range 0.2 to 1.5 square feet per lb./hr. (0.04 to 0.3 square meter per kg./hr.) of product. Also, overall reactor liquid volume should not exceed about 0.080 cubic foot per square foot (0.024 m$^3$ per m$^2$) of heat-transfer area, and preferably should not exceed 0.050 cubic foot per square foot (0.015 m$^3$ per m$^2$) of heat-transfer area. The volume should be sufficient, of course, to provide the necessary residence time needed for the reaction to take place. For many esterification reactions, a residence time of 30–60 minutes is sufficient, but some reactions will require a residence time of 2 to 3 hours.

It is essential that the tubes in the heat exchanger be of proper size to provide maximum heat transfer to the contained liquid without undue restriction on the flow of liquid through the tubes. Preferably, the tubes are cylindrical with an inside diameter in the range of 0.375 to 1.5 inches (0.95 to 3.8 cm.).

It is also essential that injection conduit 12 be connected to the lower end of heat exchanger 6 at a level well above the lowest point of recirculation conduit 4 to prevent flow reversals in the recirculation system. Preferably conduit 4 extends at least 3 feet (0.91 meter) below the injection point.

The following example is given by way of illustration.

EXAMPLE

A reactor vessel is constructed having general features similar to those described and shown in the drawing. The heat exchanger contains 121 tubes, each having an inside diameter of 0.527 inch (1.34 cm.) and a length of 6.5 feet (1.98 m.). The total heat transfer surface is about 108 square feet (10 sq. m.).

The reactor is filled to operationg level with low-molecular-weight polyethylene terephthalate having a degree of polymerization (DP) of about 6, and is heated to a temperature of 315°C. by supplying heated Dowtherm vapors to the heat exchanger. A cold mixture of ethylene glycol and terephthalic acid in the mole ratio of 4.0 to 1 is continuously supplied to the reactor through injection conduit 12 at a rate of 290 lbs./hr. (131 kg./hr.), which is equivalent to 135 lb./hr. (61 kg./hr.) of product. A high rate of recirculation is obtained. The reactor is maintained under a pressure of about 9 psig. (1.6 atm./abs.). Water vapor and excess glycol are continuously removed through vapor line 2 and low-molecular-weight polymer is continuously removed through standpipe 3. Hold-up time in the reactor is about 0.8 hour. The reactor is operated under these conditions for about 40 hours.

The product withdrawn from the reactor is found to have an average relative viscosity of 3.2 (DP of about 6), and analysis of free terephthalic acid indicates 93.6% conversion of acid groups to ester groups. The product is capable of being further polymerized to high molecular weight fiber-forming polyester. "Relative viscosity," a solution viscosity measurement related to molecular weight, is measured by the procedure described in U.S. Pat. No. 3,216,187, column 3, lines 56–61.

Although the apparatus of the invention has been illustrated with specific reference to the direct esterification of terephthalic acid with ethylene glycol, it will be appreciated that the apparatus is useful for many other types of esterification reactions as well as other types of general chemical reactions. The apparatus is most advantageously used where the continuous chemical process requires that the reacting fluid be maintained at a relatively high temperature of the order of 250° to 400°C. within close temperature limits, and which also requires a high rate of heat transfer to the reactants to maintain the temperature without localized overheating of reactants or products. Localized overheating results in thermal decomposition of organic chemical components. A particular advantage of the apparatus of the invention is the almost instantaneous mixing and heating of cold feed reactants which is provided by the injection of the feed materials at the lower end of the heat exchanger.

We claim:

1. A chemical process apparatus, which is self-stirring and provides vigorous agitation of reacting materials without the use of mechanical stirring or pumping, comprising an esterification vessel for esterification liquid, a heat exchanger for heating the liquid to a temperature of 250° to 400°C. located externally of said esterification vessel, a conduit loop for conducting liquid without the use of a pump downward from the bottom of the vessel and then upward into the heat exchanger through a lower fluid inlet, means for injecting reactant feed mixture into the lower fluid inlet of the heat exchanger at a level at least 3 feet above the lowest point of the conduit loop, means for conducting heated fluid from the heat exchanger through an upper fluid outlet and into a vessel through an inlet in the side of the vessel, means in the upper part of the vessel for withdrawing vapors, and overflow means in the vessel for withdrawing esterification product at a rate which maintains a constant liquid level within the vessel, said overflow means being located within said vessel at substantially the same height as said inlet in the side of said vessel, thereby ensuring sufficient liquid head within said vessel to maintain flow in said conduit loop.

* * * * *